United States Patent Office 3,423,340
Patented Jan. 21, 1969

3,423,340
ORGANOPOLYSILOXANE ANTIFOAM COMPOSITIONS
Hedley Samuel Bowdon Marshall, Dinas Powis, and Thomas Richard Williams, Barry, Glamorgan, Wales, assignors to Midland Silicones Limited, London, England
No Drawing. Filed Dec. 20, 1963, Ser. No. 332,295
Claims priority, application Great Britain, Dec. 21, 1962, 48,273/62
U.S. Cl. 260—13      2 Claims
Int. Cl. B01d *19/02;* C09k *3/00;* C08g *47/02*

This invention relates to siloxane antifoam emulsions.

Antifoam compositions based on organosilicon compounds, particularly organopolysiloxanes, have found widespread use in controlling the foaming that takes place during various industrial processes, for example in vat dyeing or certain paper-making operations. Although organopolysiloxane antifoam compositions have been provided and used in the form of a water-insoluble liquid or as a paste there are many applications where antifoam emulsions are preferred in view of their better dispersibility in aqueous media. However, siloxane-based antifoam emulsions have found only limited application in processes and under conditions wherein they are likely to come into contact with foodstuffs. Such use has been restricted because of the limitations on the emulsifying agents which can be employed to prepare the emulsions. Although certain emulsifying agents such as stearyl tartrate, glycerol esters, the sorbitan esters of fatty acids and their polyoxyethylene derivatives, propylene glycol esters and monostearin sodium sulphoacetate have been found to be acceptable for use on the grounds of non-toxicity, these emulsifying agents when employed alone give unsatisfactory antifoam emulsions for one reason or another. For example the use of some of these emulsifying agents leads to emulsions of very poor stability and other emulsifying agents provide siloxane emulsions having poor defoaming efficiency.

It is the object of this invention to introduce a specific combination of emulsifiers whereby an emulsion is obtained which may be suitable for use in contact with foodstuffs and which has both good shelf stability and satisfactory efficiency as an antifoam.

Accordingly, this invention provides an aqueous antifoam emulsion comprising (1) from 1 to 30% by weight of the emulsion of a benzene-soluble dimethylpolysiloxane, (2) from 1 to 15% by weight based on the weight of the dimethylpolysiloxane of a finely-divided silica, (3) from 10 to 90% by weight based on the weight of the dimethylpolysiloxane of sorbitan polyoxyethylene monostearate, (4) from 10 to 90% by weight based on the weight of the dimethylpolysiloxane of sorbitan monostearate and/or glycerol monostearate and (5) water.

The benzene-soluble dimethylpolysiloxanes employed herein are preferably those in which the ratio of methyl radicals to silicon atoms is in the range from 1.9 to 2.1. The viscosity of the dimethylpolysiloxane should be at least 50 cs. when measured at 25° C. and preferably falls within the range from 100 to 100,000 cs. Although the upper limit of the viscosity is not critical the use of the higher polymers extends the time taken to produce a suitable emulsion and for this reason we prefer to employ the low molecular weight dimethylpolysiloxanes which are more easily emulsified.

The dimethylpolysiloxanes can be chain terminated with triorganosilyl groups or with silicon-bonded hydroxyl radicals.

The operative siloxanes are essentially linear polymers containing at least 90 mol percent $(CH_3)_2SiO$ units and limited proportions of $CH_3SiO_{3/2}$ and/or $(CH_3)_3SiO_{1/2}$ units. Trace amounts of $SiO_{4/2}$ units and other organosiloxane units may be present but the closer the polymer approximates a linear polymer of $(CH_3)_2SiO$ units the better.

The quantity of dimethylpolysiloxane employed in the emulsion will depend upon the nature of the emulsion required and can vary between 1 and 30% by weight based on the total weight of the emulsion. In general organopolysiloxane antifoams are employed only in quantities which are minute compared with the volume of the medium being defoamed. It is therefore customary to provide such antifoams in a concentrated form, containing, say about 20% by weight of polysiloxane, the emulsion being diluted with water prior to use.

The finely-divided silica is preferably a synthetic silica having a high surface area. Such silicas can be obtained for example by a fume process, that is by burning a volatile silicon compound, or by a precipitation process. The silica is employed in a quantity of from 1 to 15% by weight and preferably from 2 to 5% by weight based on the weight of the dimethylpolysiloxane. The silica is conveniently mixed with the dimethylpolysiloxane prior to emulsification. Operative silicas are well known in the art.

Emulsification of the organopolysiloxane to produce the antifoam emulsions of this invention is accomplished by employing as the emulsifying agents a combination of a sorbitan polyoxyethylene monostearate with one or both of glycerol monostearate and sorbitan monostearate. Each of these emulsifiers should be present in the emulsions in a quantity of from 10 to 90% by weight based on the weight of the dimethylpolysiloxane. Desirably the total weight of the combined emulsifying agents should not exceed the weight of dimethylpolysiloxane. In order to obtain emulsions having both good storage stability and antifoam efficiency it is necessary that each of the defined emulsifying agents be employed in a quantity of at least 10% of the weight of the dimethylpolysiloxane. The most suitable balance between these properties is obtained when the sorbitan polyoxyethylene monostearate and the sorbitan or glycerol monostearates are present in the emulsion in quantities in the ranges 30 to 70% by weight and 10 to 30% by weight respectively both percentages being based on the weight of the dimethylpolysiloxane.

In order to further stabilize the emulsions of this invention a thickener such as sodium carboxymethyl cellulose can also be incorporated. Normally, the thickener, if employed, will comprise about 0.5 to about 5% of the total weight of the emulsion.

Preparation of the emulsions can be carried out by any of the normal techniques for producing siloxane emulsions. The methylpolysiloxane, in which the silica can be incorporated, can be thoroughly mixed with the emulsifying agents, employing heat if necessary. At this stage it is convenient to add the thickener, when employed, and the whole can then be dispersed in water either by rapid stirring or colloid milling or both.

The emulsions of this invention can contain in addition to the essential ingredients additives such as rust inhibitors and antioxidants. Mould growth inhibitors such as sorbic acid can also be incorporated into the emulsions in minor proportions (e.g. 0.1 to 5% my weight of the emulsion).

The following example illustrates the invention.

EXAMPLE 1

Antifoam emulsions were made up employing a variety of emulsifying agents in the proportion shown in the table. The siloxane component of the emulsions comprised an intimate mixture of a dimethylpolysiloxane and 4% by weight, based on the weight of the polysiloxane, of a finely divided silica, the mixture having a final viscosity of about 1,000 cs. at 25° C.

The emulsions were prepared by adding the emulsifying agents to the mixture of the dimethylpolysiloxane and the silica and thoroughly mixing. Heat was employed where necessary to facilitate the mixing step. Where the thickeners methyl cellulose or sodium carboxymethyl cellulose were employed these were then added and the whole dispersed in water by colloid milling.

The antifoaming efficiencies of the emulsions were tested after diluting the emulsions to obtain a solution containing 10% by weight of the emulsion as prepared. Air was bubbled through 200 cc. of an 0.1% solution of a commercial surface active agent at a rate of 150 cc./min. to produce foaming of the solution. Quantities of the diluted emulsion were than added stepwise to the foamed solution and the efficiency of the emulsion was recorded as the level of the emulsion required to just inhibit the formation of foam.

The results listed in the table show the superior defoaming efficiency of the emulsions of this invention in contrast to those emulsions prepared employing other siloxane emulsifying agents.

That which is claimed is:

1. An aqueous antifoam emulsion consisting essentially of (1) from 1 to 30% by weight of the emulsion of a benzene-soluble dimethylpolysiloxane, (2) from 1 to 15% by weight based on the weight of the dimethylpolysiloxane of a finely-divided silica, (3) from 10 to 90% by weight based on the weight of the dimethylpolysiloxane of sorbitan polyoxyethylene monostearate, (4) from 10 to 90% by weight based on the weight of the dimethylpolysiloxane of monostearate selected from the group consisting of sorbitan monostearate, glycerol monostearate and mixtures thereof, (5) water and containing (6) sodium carboxy methyl cellulose.

2. The emulsion of claim 1 containing (3) from 30 to 70% by weight of sorbitan polyoxyethylene monostearate and (4) from 30 to 70% by weight of monostearate selected from the group consisting of sorbitan monostearate, glycerol monostearate and mixtures thereof, said percentages being based on the weight of dimethylpolysiloxane present.

| Component | Parts by weight in emulsion | | | | | | | | | | |
|---|---|---|---|---|---|---|---|---|---|---|---|
| Silica-containing dimethylpolysiloxane | 10 | 10 | 10 | 10 | 10 | 10 | 10 | 10 | 10 | 10 | 10 |
| Glycerol monostearate | 2 | 2 |  | 5 | 2 | 3 | 3 | 2 |  |  |  |
| Propylene glycol monostearate |  | 3 | 5 |  | 3 |  |  |  |  |  |  |
| Stearyl tartrate | 2 |  |  |  |  |  | 3 | 2 |  |  |  |
| Propylene glycol alginates | 1 | 1 |  |  |  |  |  |  |  |  |  |
| Sorbitan polyoxyethylene monostearate |  |  |  |  |  |  |  | 3 | 5 | 3 | 5 |
| Sorbitan monostearate |  |  |  |  |  |  |  |  |  | 2 | 2 |
| Methyl cellulose |  |  |  | 2.5 |  | 2 |  |  | 2 |  |  |
| Sodium carboxymethyl cellulose |  |  |  |  |  |  | 2 |  | 2 | 2 | 1.5 |
| Water | 85 | 84 | 82.5 | 85 | 82 | 82 | 83 | 83 | 83 | 83 | 81.5 |
| Antifoam efficiency in p.p.m.* | >1,600 | >1,600 | >1,600 | >1,600 | >1,600 | >1,600 | >1,600 | 800 | 1,600 | 600 | 600 |

*Parts per million.

References Cited

UNITED STATES PATENTS 3,076,768  3/1963  Boylan _____ 252—358
3,113,930 12/1963  Chevalier _____ 252—358

OTHER REFERENCES

Reinhold, Condensed Chemical Dictionary, 5th ed., p. 1019, 1956.

WILLIAM H. SHORT, *Primary Examiner.*

E. A. NIELSEN, *Assistant Examiner.*

U.S. Cl. X.R.

260—29.2; 252—358; 260—18